United States Patent [19]

Stifelman et al.

[11] Patent Number: 4,615,800
[45] Date of Patent: Oct. 7, 1986

[54] DUPLEX FILTER APPARATUS

[75] Inventors: Jack Stifelman; Patrick Fisher, both of Bloomington; John F. Connelly, Minnetonka, all of Minn.

[73] Assignee: Donaldson Company, Inc., Minneapolis, Minn.

[21] Appl. No.: 690,871

[22] Filed: Jan. 14, 1985

[51] Int. Cl.$^4$ .............................................. B01B 29/36
[52] U.S. Cl. .................................... 210/132; 210/133; 210/136; 210/340
[58] Field of Search ............... 210/132, 133, 135, 106, 210/136, 340, 347, 341

[56] References Cited

U.S. PATENT DOCUMENTS

| | | | |
|---|---|---|---|
| 3,154,485 | 10/1964 | Liddell | 210/133 |
| 3,485,369 | 12/1969 | Voorheis | 210/132 |
| 3,979,292 | 9/1976 | Kuhn | 210/135 |
| 4,033,870 | 7/1977 | Parquet et al. | 210/132 |
| 4,496,460 | 1/1985 | Haarstad et al. | 210/132 |

*Primary Examiner*—John Adee
*Attorney, Agent, or Firm*—Merchant, Gould, Smith, Edell, Welter & Schmidt

[57] ABSTRACT

The present invention is directed to a duplex filter apparatus which provides for a first primary filter path and a second path for secondary filtration. The first path includes a shutoff valve on one side of the primary filter and a check valve on the downstream side. The second path includes a regulating bypass valve on the upstream side of the secondary filter and a check valve on the downstream side. The regulating bypass valve gradually shifts fluid flow from the first path to the second path when differential pressure across the primary filter increases beyond a predetermined level. A reservoir return bypass valve directs fluid flow gradually from the secondary filter when differential pressure across the secondary filter increases beyond a predetermined level. Bleed valves are provided to relieve pressure on filter elements when the filter elements are isolated so that servicing may occur.

5 Claims, 6 Drawing Figures

DUPLEX FILTER APPARATUS

FIELD OF THE INVENTION

The present invention is directed to duplex filter apparatus and, more particulary, to apparatus having parallel filters with regulating mechanism for switching fluid flow from a primary filter when it becomes dirty to a secondary filter.

BACKGROUND OF THE INVENTION

Duplex filter systems are known. In a duplex filter system the secondary filter takes flow when the primary filter is dirty or while the primary filter is being serviced. Such secondary backup is more efficient and less costly than allowing an expensive machine to be inoperative while its only filter for its hydraulic or lubrication system is being serviced.

Conventional duplex filter systems, however, have a number of disadvantages. Known systems require the attention of an operator to manually shift a multi-port plug valve to direct fluid from the primary filter to the secondary filter when an indicator shows the primary filter is sufficiently dirty or plugged. In addition, some duplex filter systems include bypass valves in one or both the primary and secondary filters which allow passage of dirty fluid whenever the particular filter is neglected and becomes sufficiently dirty or plugged. Such a system allows the dirty fluid to pass into the machine, a situation which may then cause minor, if not major, damage.

Other duplex filter systems have no bypass valves, but have low to medium collapse filter elements. If the filter is neglected, at a differential pressure across the filter in the range of 100 to 300 PSI or so, the element will collapse and again dirty fluid passes into the machine or use device. Still other duplex filter systems have no bypass valves, but solve the filter element collapse problem by using expensive filter elements which collapse at a high differential pressure, for example, 2000 to 3000 PSI. In addition to the high cost of such elements, a neglected filter in this case causes power drawn by the pump to increase excessively until the filter element collapses.

Thus, to the thoughtful engineer, present disadvantages of known duplex filter systems often outweigh the primary advantage of having a backup secondary filter for reducing or eliminating machine down time.

The invention approaches duplexing by eliminating the precision multi-port plug valving traditionally provided as a lever operated means of switching from the primary filter to the secondary filter. These multi-port valves normally are required to be unique to each manufacturer. In its place the invention advantageously uses a low cost commercially available ball valve and a novel regulating valve to accomplish the same shifting purpose and to gain in addition the automatic shift from primary filter to secondary filter.

SUMMARY OF THE INVENTION

The present invention is directed to a duplex filter apparatus having primary and secondary filters in parallel between a main inlet and a main outlet. First and second check valve devices protect the filters from reverse fluid flow. A manual shutoff valve is installed between the primary filter and the main inlet, while a regulating mechanism regulates fluid flow between the primary filter and the secondary filter. The regulating mechanism automatically shifts fluid flow to the secondary filter whenever the primary filter becomes sufficiently dirty. The shutoff valve isolates the primary filter for servicing.

In a preferred embodiment, the primary and secondary filter elements are supported in canisters from filter heads. A conventional shutoff valve is attached to the inlet of the filter head for the primary filter. An inlet manifold is attached to the shutoff valve and also to the inlet of the filter head for the secondary filter. The inlet manifold includes the main inlet opening and houses the regulating bypass valve. An outlet manifold is attached to the outlets of the filter heads of both the primary and the secondary filters. The outlet manifold houses both check valve devices which protect both primary and secondary filters from reverse flow. The outlet manifold includes the main outlet opening. In this configuration, the apparatus is compactly housed and readily installed in a fluid line leading to a use device.

The regulating bypass valve in the preferred embodiment advantageously provides for an uninterrupted flow of fluid into the secondary filter element whenever the shutoff valve is closed or whenever the differential pressure across the primary filter element reaches the predetermined level. The uninterrupted flow is possible due to the seat for the spool of the valve being immediately adjacent to or a part of both the inlet and outlet ports of the valve.

A bypass valve to direct fluid from the inlet of the secondary filter to the fluid reservoir is a further feature of a preferred embodiment. This feature protects the use device from unfiltered filter in the case both the primary and the secondary filter elements are excessively dirty or clogged. In a use system including a hydraulic motor, the motor then becomes sluggish without drawing excessive power as in the art.

In addition, the present apparatus preferably includes manually operable bleed valves between the check valve and the shutoff valve in the primary filter path and between the check valve and the regulating bypass valve in the secondary filter path. When the shutoff valve is closed, the regulating bypass valve immediately opens. In this case, fluid continues to flow and be filtered, while the bleed valve downstream from the shutoff valve may be operated to relieve the pressure in the primary filter and allow servicing thereof. Similarly, when the primary filter is clean, the regulating bypass valve closes. In this case, the bleed valve in the secondary filter path may be operated to relieve any pressure on the secondary filter element so it may be serviced.

Thus, the present apparatus not only provides for primary and secondary filtering and system bypass in the case of both filters being clogged, but also provides for servicing either filter without shutting down the use device. These advantages and other objects obtained by the present invention may be better understood by reference to the drawings and the descriptive matter hereinafter wherein a preferred embodiment is illustrated and described in detail.

DETAILED DESCRIPTION OF THE PREFERRED EMBODIMENT

Figure 1:
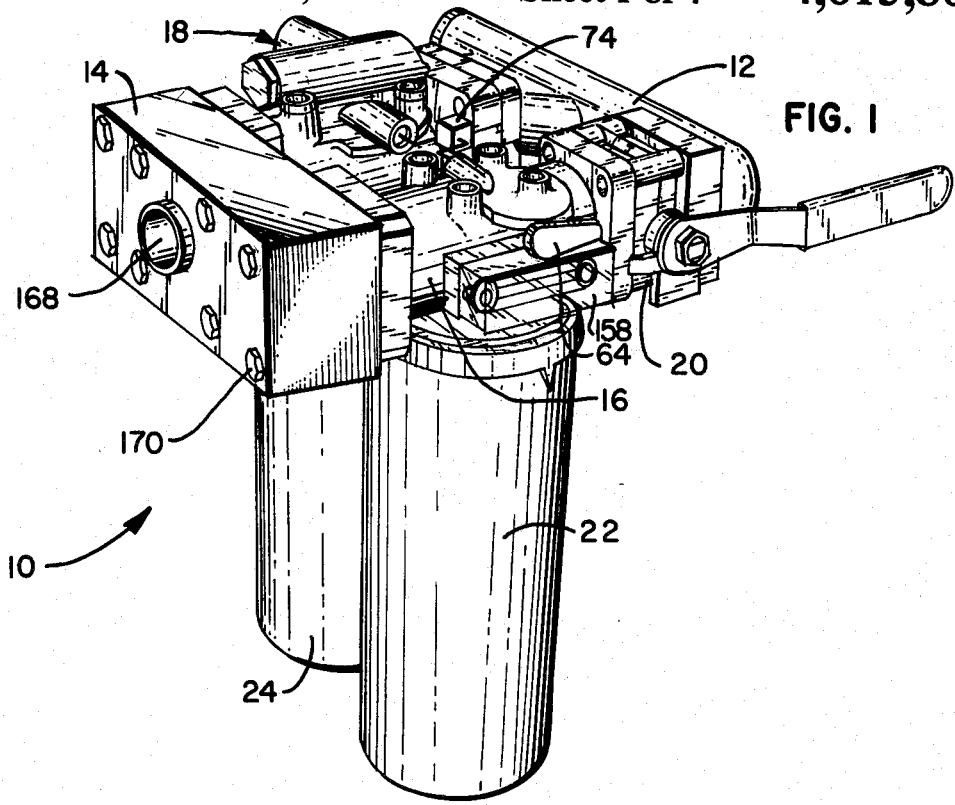
FIG. 1 is a perspective view of apparatus in accordance with the present invention.

Referring now to the drawings wherein like reference numerals designate identical or corresponding parts throughout the several views, and more particularly to FIG. 1, apparatus in accordance with the present invention is designated generally by the numeral 10. Duplex filter apparatus 10 includes an inlet manifold 12 and an outlet manifold 14. Connected between inlet and outlet manifolds 12 and 14 are primary and secondary filter heads 16 and 18, with shutoff valve 20 being between primary filter head 16 and inlet manifold 12. Spin-on canisters 22 and 24 are fastened to primary and secondary filter heads 16 and 18, respectively, and contain filter elements.

Figure 2:
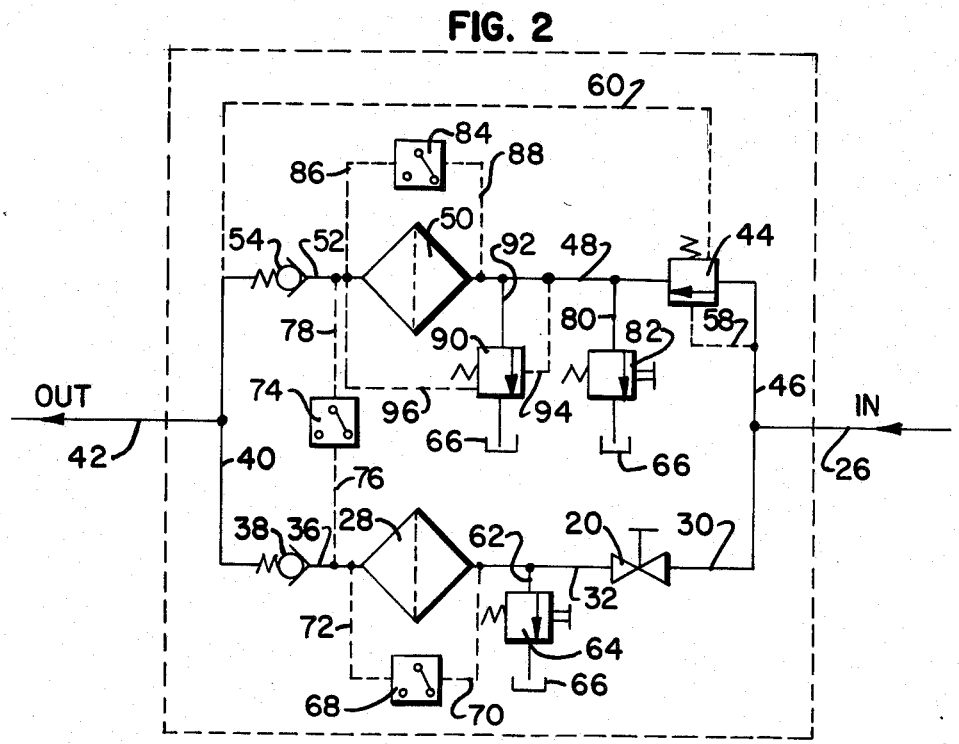
FIG. 2 is a schematic illustration of the hydraulic circuit associated with apparatus in accordance with the present invention.

A schematic circuit illustrating possible fluid flow between the main inlet and main outlet is shown in FIG. 2. Line 26 is representative of a fluid inlet to apparatus 10. Fluid flows forwardly in a first path to primary filter 28 via lines 30 and 32 and shutoff valve 20. From primary filter 28, the fluid flows through line 36 to check valve 38 and line 40 to outlet line 42. When the differential pressure across primary filter 28 reaches a predetermined level, as primary filter 28 becomes clogged, regulating bypass valve 44 opens, at least partially, to allow flow through a parallel second path. In this case, fluid from inlet line 26 flows through line 46 to main bypass valve 44. Fluid then flows through line 48 to secondary filter 50. From secondary filter 50, fluid flows through line 52 and check valve 54 to line 56 and then outlet line 42. Check valves 38 and 54 prevent a reverse flow of fluid. Regulating bypass valve 44 prevents a forward flow of fluid until pressure upstream of its spool is greater than pressure downstream of its spool by a predetermined amount. Such pressure differential is obtained by a pair of sensing lines which are in fluid communication preferably with fluid upstream of shutoff valve 20 and downstream from check valve 38 in the first fluid path. In this way, the differential pressure across primary filter 28 is obtained. When primary filter 28 is clean, the differential pressure is small. When primary filter 28 gets more dirty or becomes clogged, the differential pressure is greater and at some point reaches and exceeds the predetermined level at which regulating bypass valve 44 is set. Dotted line 58 extends between bypass valve 44 and line 46 and is, therfore, in fluid communication with fluid upstream of shutoff valve 26. Dotted line 60 extends between bypass valve 44 and line 56 and is, therefore, in fluid communication with fluid downstream from check valve 38. It is noted that line 58 is present for a schematic illustration and in the preferred embodiment line 58 and line 46 are passageway 104.

Shutoff valve 20 is used to isolate primary filter 28. When shutoff valve 20 is closed, the differential pressure upstream of shutoff valve 20 and downstream from check valve 38 becomes large so that regulating bypass valve 44 opens to allow fluid to flow through the second path including secondary filter 50. With primary filter 28 isolated, pressure between shutoff valve 20 and check valve 38 may be relieved through line 62 and bleed valve 64 to a reservoir 66. Similarly, when regulating bypass valve 44 is closed, secondary filter 50 is isolated between valve 44 and check valve 54. Pressure on secondary filter 50 may be relieved through line 80 and bleed valve 82 to reservoir 66.

If desired, an indicator 68 having sensing lines 70 and 72 in fluid communication with lines 32 and 36 on opposite sides of primary filter 28 may be used to show the state of primary filter 28 so that it may be serviced before it becomes excessively clogged. It is preferable to include a second indicator 74 with lines 76 and 78 extending to line 36 downstream from primary filter 28 and to line 52 downstream from secondary filter 50, respectively, in order to determine which path is receiving the most fluid flow. Indicator 74 may be, for example, a shuttle piston visible on observation. In order for a shuttle to operate effectively, it is noted that the springs 186 in check valves 38 and 54 should be balanced, that is, have similar compression coefficients. As with indicator 68 and primary filter 28, it may be further desirable to include a third indicator 84 connected by lines 86 and 88 to lines 48 and 52, respectively, on either side of secondary filter 50 to determine its state from the differential pressure maintained across it.

In addition, apparatus 10 preferably includes a reservoir return bypass valve 90. Valve 90 only functions when regulating bypass valve 44 is open and secondary filter 50 becomes clogged. Valve 90 is normally closed, and opens only when a predetermined level of differential pressure across secondary filter 50 is sensed. Reservoir return bypass valve 90 is connected by line 92 to line 48 upstream from secondary filter 50. Valve 90 empties into reservoir 66. Sensing lines 94 and 96 are in fluid communication with line 48 upstream from secondary filter 50 and line 52 downstream from secondary filter 50 so as to sense the differential pressure across filter 50. As with line 58 for regulating valve 44, it is noted that line 94 is present for schematic illustration purposes and is not necessarily separate from line 48.

Figure 3:
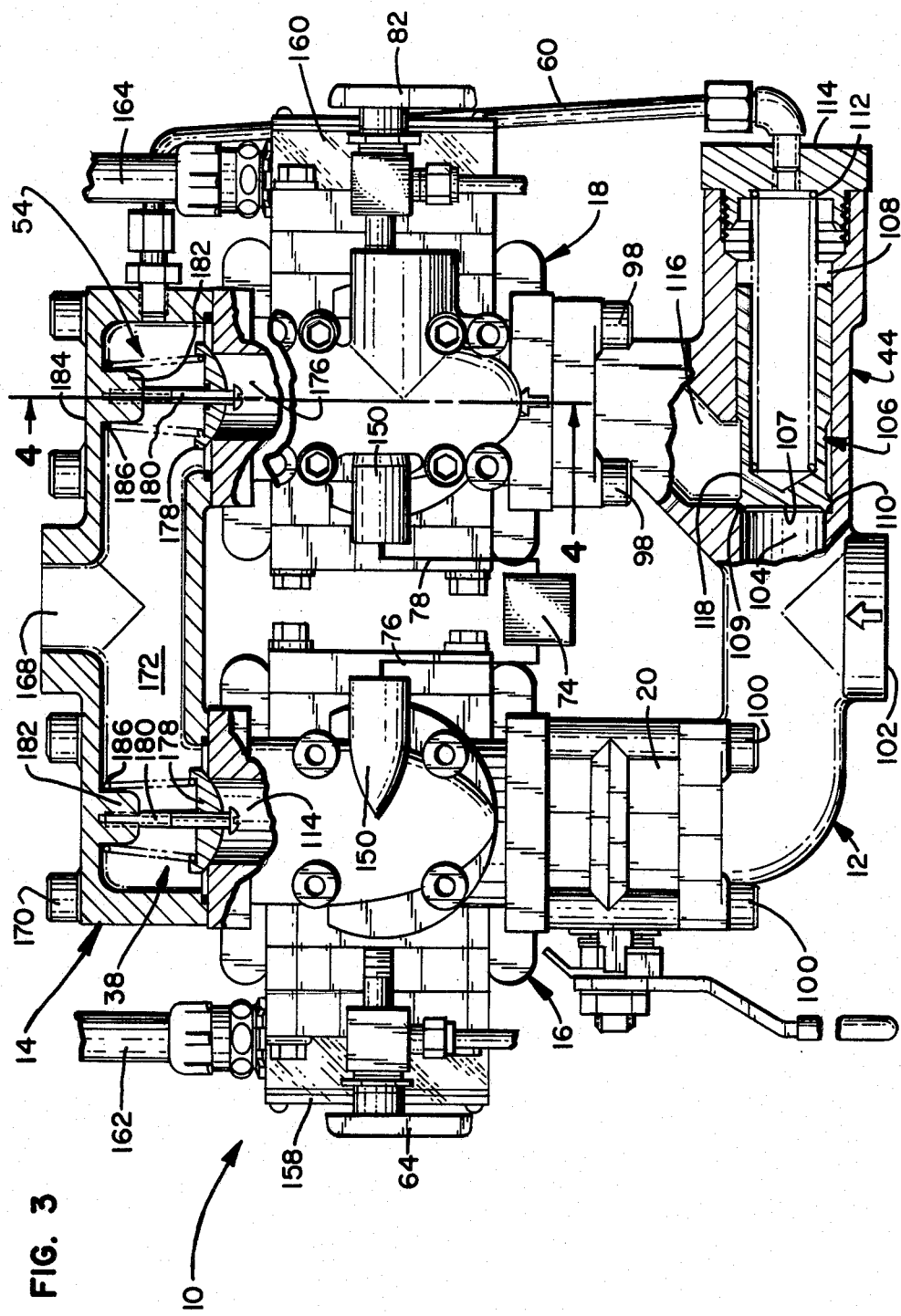
FIG. 3 is a top plan view, partially broken away, of the apparatus of FIG. 1.

As shown in FIG. 3, inlet manifold 12 is attached with bolts 98 to filter head 18 which functions to hold and work in conjunction with secondary filter 50. Inlet manifold 12 is also attached with bolts 100 to shutoff valve 20. Inlet manifold 12 includes main inlet 102. Manifold 12 has a passageway 104 from main inlet 102 for fluid communication with shutoff valve 20 and spool 106 of regulating bypass valve 44, formed as an integral part of inlet manifold 12.

Figures 4, 5:
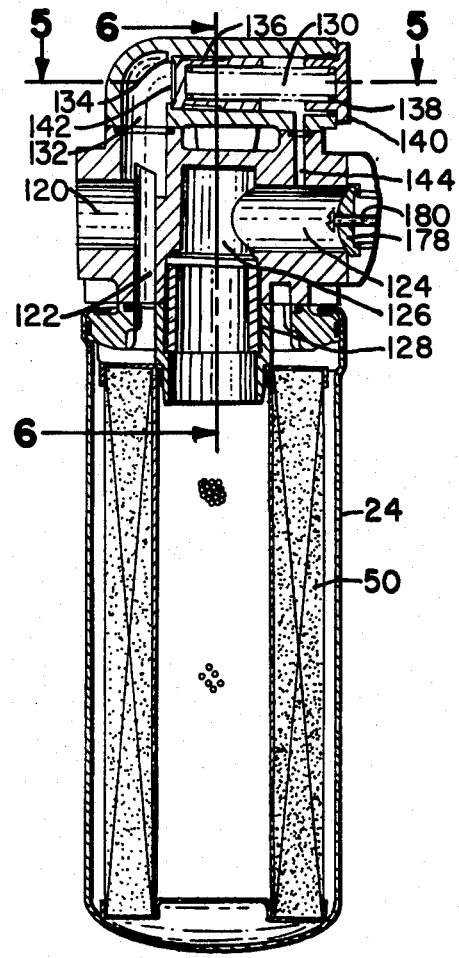
FIG. 4 is a cross-sectional view, taken along line 4—4 of FIG. 3.
FIG. 5 is a cross-sectional view, taken along line 5—5 of FIG. 4.

Valve 44 includes a bore 108 for receiving spool 106. Bore 108 is slightly larger than passageway 104 so that the end 110 may form seat 112 for spool 106. Passageway 104 forms essentially an inlet port for valve 44. Spool 106 is biased against seat 110 by spring 112. Spool 106 has a cuplike shape to receive one end of spring 112. The base 107 of spool 106 is recessed so that the outer edge 109 at base 107 has a rather sharp edge. Such recess then presents approximately the same surface area to pressure on the upstream side of spool 106 as on the other side. Also, fluid may pass more immediately past edge 109 from passageway 104 to passageway 116. The other end of spring 112 butts against plug 114 which is threaded into the end of bore 108. A second passageway 116 extends from the sidewall 118 of spool 106 to fluid communication with an inlet opening 120 of filter head 18 (see FIG. 4). Passageway 116 is essentially an outlet port for regulating bypass valve 106. Seat 110 is adjacent to or forms a portion of both inlet port or passageway 104 and outlet port or passageway 116. As a result, as soon as the pressure in passageway 104 is greater than the combined force of the pressure in bore 108 and the force of spring 112, spool 106 retracts gradually and fluid passes from passageway 104 to passageway 116 and, therefore, maintains continuous flow from main inlet 102 to secondary filter 50 even though shutoff valve 20 is closed or primary filter 28 becomes clogged.

It is noted that shutoff valve 20 is a standard two position valve. Bolts 100 not only hold manifold 12 to valve 20, but also hold valve 20 to filter head 16 which functions to hold and work in conjunction with primary filter 28. Filter head 18 is shwon in FIGS. 4–6. Filter head 16 is similar to filter head 18, except as indicated hereinafter. Filter head 18 is preferably a one piece casting which includes a number of passageways. One end or side includes a threaded cylindrical wall structure for receiving a spin-on canister 24 containing a filter element, in this case element 50. Inlet opening 120 is in fluid communication with a partially cylindrical passageway 122 which opens into canister 24 for passage through filter 50, preferably from outside to inside. At approximately the same elevational height and approximately directly across from inlet opening 120 is outlet opening 124. Outlet opening 124 is in fluid communication with a central passageway 126 which passes through threaded connector 128 of canister 24 into the central portion of element 50.

Included as a part of filter head 18, but not filter head 16, is reservoir return bypass valve 90. Bypass valve 90 is similar to regulating bypass valve 44. Valve 90 includes in head 18 a bore 130. Bore 130 is in fluid communication with inlet opening 120 and passageway 122 via passageway 132. A ring-like protrusion is formed between bore 130 and passageway 132 to create a seat 134 for spool 136. Spool 136 has a cup-like shape and is held against seat 134 by a coil spring 138. Spring 138 filts within spool 136 at one end and butts against plug 140 at the other end of bore 130. So as to sense the differential pressure across filter 50, the inlet pressure 132 is applied to the bottom 142 of spool 136, while bore 130 and the interior of spool 136 is subjected to the outlet pressure via passageway 144 which extends between bore 130 and outlet opening passage 124. As with regulating bypass valve 44, reservoir return bypass valve 90 includes an outlet port 146 (see FIG. 5) formed to include a passageway which ends at a side 148 of shuttle 136. Seat 134 has a portion in common with or immediately adjacent to both inlet port or passageway 132 and outlet port 146. In this way, as soon as the inlet pressure overcomes the pressure and the force of spring 138 on the cup portion of spool 136 so that spool 136 moves, fluid immediately passes from passageway 132 to outlet port 146.

Figure 6:
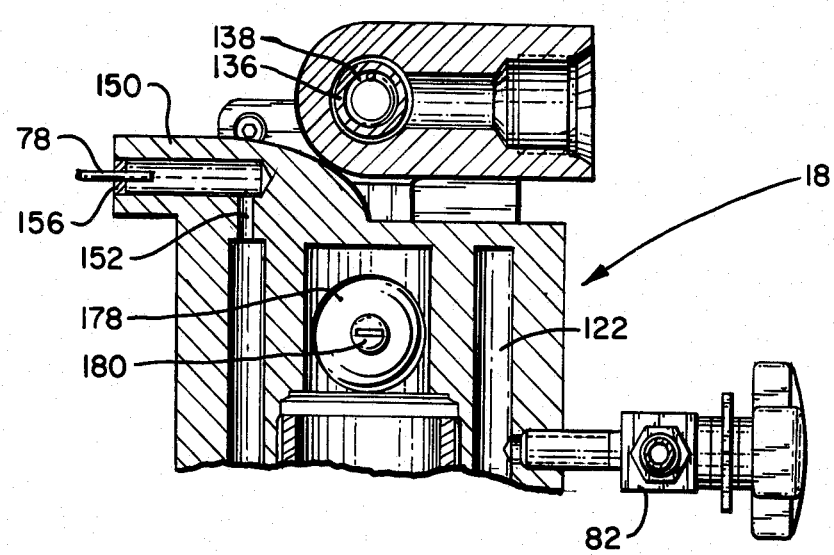
FIG. 6 is a cross-sectional view, taken along line 6—6 of FIG. 4.

As shown in FIG. 6, bleed valve 82 is attached to a sidewall of filter head 18 so that valve 82 is in fluid communication with partially cylindrical passage 122. Bleed valves 20 and 82 may be standard, manually operable, two position valves. Also, boss 150 having a cavity 152 connected by passageway 154 to partially cylindrical passage 122 is shown with a plug 156 and tube 78 passing therethrough. Tube 78 was discussed hereinbefore in FIG. 2 relative to shuttle piston indicator 74. Indicator 74 is further schematically illustrated in FIG. 3 with lines 78 and 76 shown leading from indicator 74 to bosses 150 and 150' at filter heads 18 and 16, respectively. Housings 158 and 160 for indicators 68 and 84 with respect to primary and secondary filters 28 and 50, respectively, are also shown in FIG. 3. Electrical cable 162 and 164 extends away from housings 158 and 160 to appropriate readout devices. Indicators 68, 74 and 84 may be visual or electrical types of a variety commercially available.

Outlet manifold 14 is an elongated housing including main outlet 168. Manifold 14 extends from filter head 16 to filter head 18 and is attached to each with a set of bolts 170. A cavity 172 is formed in manifold 14 to provide fluid communication from outlet opening 174 in filter head 16 and from outlet opening 176 in filter head 18 to main outlet 168. Check valves 38 and 54 are attached to manifold 14 to prevent reverse flow from cavity 172 back into outlet openings 174 or 176. Each check valve 38 and 54 includes a stop 178 attached by a screw 180 to a boss 182 in sidewall 184 of manifold 166. A coil spring 186 biases stop 178 against the particular outlet opening. In this way, the fluid opens stop 178 as fluid flows forwardly through a filter element and out an outlet opening. Spring 184, however, tends to keep stop 178 seated against a particular outlet opening and prevents fluid flow in a reverse direction from entering the particular outlet opening.

It is noted that sensing line 60 for regulating bypass valve 44 extends between outlet manifold 166 and bore 108 of inlet manifold 12. Line 60 provides fluid communication between cavity 172 and bore 108.

In use, spin-on filters are attached to both filter heads 16 and 18. Shut off valve 20 is opened. Apparatus 10 is appropriately connected into a fluid system which requires filtration so that fluid flows forwardly from main inlet 102 to main outlet 168. During normal flow, with reference to FIG. 2, fluid flows through connecting lines from input line 26 to shutoff valve 20 to primary filter 28 and through check valve 38 to output line 42. Indicator 68 shows the differential pressure across primary filter 28. Indicator 74 shows that fluid is flowing in the first path of duplex filter apparatus 10.

During a cold start, surge flow, or when primary filter 28 becomes sufficiently dirty or plugged, flow is shifted to the second flow path. Regulating bypass valve 44 gradually opens proportionate to the differential pressure over a predetermined minimum across the primary filter. Fluid flows in the second path through bypass valve 44 and secondary filter 50 to check valve 54 and out outlet line 42. Indicator 84 indicates the differential pressure across secondary filter 50. If indicator 84 continues to show flow after the system has warmed or after any surge condition has subsided, then the filter element in primary filter 28 should be serviced.

Primary filter 28 may be serviced by manually closing shutoff valve 20 so that forward flow is prevented from reaching filter 28. Reverse flow is prevented from reaching filter 28 by check valve 38. With primary filter 28 isolated, bleed valve 64 is opened to relieve pressure to reservoir 66. Filter 28 may then be replaced. At this time, complete flow is passing through the second path and the use device continues in continuous operation. On reinstalling a clean filter 28, shutoff valve 20 is opened. The differential pressure across filter 28 is then very low and bypass valve 44 closes. Secondary filter 50 may now be serviced if desired. Secondary filter 50 is isolated since regulating bypass valve 44 is closed, and check valve 50 prevents reverse flow. Indicator 84 will show that no flow is occurring in secondary filter 50.

Pressure on filter 50 is relieved to reservoir 66 by opening bleed valve 82. Filter 50 may then be serviced.

Reservoir return bypass valve 90 operates if both primary and secondary filters 28 and 50 become clogged or if shufoff valve 20 is closed and secondary filter 50 becomes clogged. Valve 90 opens gradually depending on the differential pressure across secondary filter 50. Neither valve 44 now valve 90 opens until a predetermined level of differential pressure is sensed. Once sensed, the opening is gradual so that complete flow is not diverted from the main flow path until an extreme condition exists. As valve 90 opens, fluid is diverted to reservoir 66.

The present invention overcomes all the disadvantages of a conventional duplex dilter. Furthermore, it does so in a way which eliminates the expensive, traditional multi-port lever operated valve. The present invention utilizes easily and inexpensively manufactured cast inlet and outlet manifolds which includes the regulating valve and the check valves. A readily available ball valve is used, but it and the check and regulating valves and cast parts are much less expensive and more easily used than prior art systems.

In addition, the present invention shifts flow automatically from a primary filter path to a secondary filter path when the differential pressure across the primary filter path reaches a predetermined level. Also, apparatus 10 does not bypss the filters to allow dirty fluid to flow to the use device. Apparatus 10 does not require high collapse filter elements, nor does it subject its filter elements to a collapse pressure. Rather, fluid is gradually shifted from a primary path to a secondary path when a predetermined differential pressure across the primary filter is sensed. If needed, fluid is still further gradually diverted to reservoir when a predetermined level of differential pressure is sensed across the secondary filter element. Finally, mechanisms for isolating and relieving pressure across each of the primary and the secondary filters are provided so that the filters may be serviced, and indicators provide information on how the system is functioning and an indication as to when servicing should be accomplished.

These advantages and details of structure and function as set forth, however, are considered exemplary. It is understood that equivalents are available. Therefore, changes made, especially in matters of shape, size, arrangement, and combinations of known components and assemblies, to the full extent extended by the general meaning of the terms in which the following appended claims are expressed, are understood to be within the principle of the invention.

What is claimed is:

1. Filter apparatus having a main inlet and a main outlet, said apparatus comprising:

primary and secondary filiters in parallel between said main inlet and said main outlet;

first and second means for checking reverse fluid flow into said primary and secondary filters, respectively;

a manual shut-off valve between said primary filter and said main inlet;

means for regulating fluid flow between said primary and secondary filters as a function of differential pressure across said primary filter, said regulating means including a main bypass valve, said main bypass valve including means for sensing differential pressure across said primary filter from upstream of said shut-off valve to downstream of said first checking means, said main bypass valve further including means for keeping said valve closed until a predetermined level of differential pressure is sensed by said sensing means; and a secondary bypass valve, said secondary bypass valve including second means for sensing differential pressure across said secondary filter, said secondary bypass valve further including second means for keeping said secondary bypass valve closed until a predetermined level of differential pressure across said secondary filter is sensed by said second sensing means, said secondary bypass valve being connected to divert flow from said secondary filter to a reservoir when the differential pressure across said secondary filter reaches the predetermined level.

2. A duplex filter apparatus having a main inlet and a main outlet, said apparatus comprising:

first means for filtering fluid flowing through a first fluid communication path, said first path having forward flow from said main inlet to said main outlet, said first filtering means including a first filter downstream in said first path from said main inlet and upstream in said first path from said main outlet, said first filtering means also including a shut off valve upstream in said first path from said first filter, said first filtering means further including first means for checking reverse fluid flow in said first path, said first checking means being downstream from said first filter;

second means for filtering fluid flowing through a second fluid communication path, said second path being in parallel with said first path and also having forward flow from said main inlet to said main outlet, said second filtering means including a second filter downstream in said second path from said main inlet and upstream in said second path from said main outlet, said second filtering means also including second means for checking reverse fluid flow in said second path, said second checking means being downstream from said second filter;

said first and second filtering means including first and second filter heads, respectively, with first and second inlet openings, respectively, said shutoff valve being attached to said first filter head to be in fluid communication with said first inlet opening, said first and second filter heads also including third and fourth outlet openings, respectively, said first and second filtering means further including first and second cannisters, respectively, for cooperating with said first and second filter heads to receive said first and second filters, respectively, said first and second filtering means still further including a common outlet manifold, said outlet manifold including said main outlet and having first and second means for attaching to said first and second filter heads, respectively, said first and second attaching means including third and fourth inlet opening for aligning with the first and second outlet openings of said first and second filter heads, respectively, said first and second checking means including first and second stops, respectively, and third and fourth means for yieldably attaching said first and second stops, respectively, to said outlet manifold, whereby said first and second stops close said third and fourth inlet openings, respectively, to reverse flow and yieldably open said third and fourth inlet openings for passage of forward fluid flow; and means for regulating fluid flow between said first and second filters, said regulating means initiating regulation at a differential pressure greater than a predetermined minimum, said regulating means including first means for sensing the differential pressure across said first filter from upstream of said shut off valve to downstream of said first checking means, said regulating means being in said second path downstream from said main inlet and upstream from said second filter;

said regulating means including a housing having first and second outlet openings as well as said main inlet, said first outlet opening being in fluid communication with said shutoff valve and said second outlet opening being in fluid communication with said second inlet opening of said second filter head.

3. A duplex filter apparatus having a main inlet and a main outlet, said apparatus comprising:

first means for filtering fluid flowing through a first fluid communication path, said first path having forward flow from said main inlet to said main outlet, said first filtering means including a first filter downstream in said first path from said main inlet and upstream in said first path from said main outlet, said first filtering means also including a shut off valve upstream in said first path from said first filter, said first filtering means further including first means for checking reverse fluid flow in said first path, said first checking means being downstream from said first filter;

second means for filtering fluid flowing through a second fluid communication path, said second path being in parallel with said first path and also having forward flow from said main inlet to said main outlet, said second filtering means including a second filter downstream in said second path from said main inlet and upstream in said second path from said main outlet, said second filtering means also including second means for checking reverse fluid flow in said second path, said second checking means being downstream from said second filter; and means for regulating fluid flow between said first and second filters, said regulating means initiating regulation at a differential pressure greater than a predetermined minimum, said regulating means including first means for sensing the differential pressure across said first filter from upstream of said shut off valve to downstream of said first checking means, said regulating means being in said second path downstream from said main inlet and upstream from said second filter, said regulating means also including a main bypass valve for opening at said predetermined minimum differential pressure to pass fluid from said main inlet to said second filter, said main bypass valve including a housing with an inlet port and an outlet port, said main bypass valve further including a spool and a seat in said housing for receiving said spool to close said inlet port, said seat forming a portion of both said inlet port and said outlet port, said main bypass valve also having means for biasing said spool against said seat.

4. Apparatus in accordance with claim 3 including a return valve in said second path upstream from said second filter and downstream from said regulating means, said return valve including means for preventing opening at a differentinal pressure less than a predetermined minimum, said return valve also including second means for sensing the differential pressure across said second filter from upstream of said second checking means to downstream of said regulating means, whereby when said predetermined differential pressure is reached and said preventing means is overcome so that said return valve opens, fluid bypasses said second filter and may be returned to a reservoir.

5. A duplex filter apparatus having a main inlet and a main outlet, said apparatus comprising:

first means for filtering fluid flowing through a first fluid communication path, said first path having forward flow from said main inlet to said main outlet, said first filtering means including a first filter downstream in said first path from said main inlet and upstream in said first path from said main outlet, said first filter means also including a shutoff valve upstream in said first path from said first filter, said first filtering means further including first means for checking reverse fluid flow in said first path, said first checking means being downstream from said first filter;

second means for filtering fluid flowing through a second fluid communication path, said second path being in parallel with said first path and also having forward flow from said main inlet to said main outlet, said second filtering means including a second filter downstream in said second path from said main inlet and upstream in said second path from said main outlet, said second filtering means also including second means for checking reverse fluid flow in said second path, said second checking means being downstream from said second filter;

means for regulating fluid flow between said first and second filters, said regulating means including first means for sensing differential pressure across said first filter from upstream of said shutoff valve to downstream of said first checking means, said regulating means further including a main bypass valve in said second path downstream from said main inlet and upstream from said second filter, said main bypass valve having a housing with an inlet port and an outlet port, said main bypass valve further having a spool and a seat in said housing, said seat for receiving said spool to close said inlet port, said seat forming a portion of both said inlet port and said outlet port, said main bypass valve further having means for biasing said spool against said seat to prevent said spool from retracting from said seat until a predetermined minimum differential pressure is exceeded as sensed by said sensing means;

a reservoir return valve in said second path upstream from said second filter and downstream from said regulating means, said return valve including means for preventing opening at a differential pressure less than a predetermined minimum, said return valve including second means for sensing the differential pressure across said second filter; and first and second bleed valves in said first and second paths, respectively, said first bleed valve being upstream from said first checking means and downstream from said shutoff valve, said second bleed valve being upstream from said checking means downstream from said regulating means;

whereby said main bypass valve shifts fluid from flowing through said primary filter to said secondary filter when the predetermined minimum differential pressure is sensed by said first sensing means and seid reservoir return valve shifts fluid from flowing through said second filter when said predetermined minimum differential pressure is sensed by said second sensing means thereby allowing fluid flow through said first and second filters only until they are sufficiently clogged, said first and second bleed valves providing for bleeding fluid pressure from said first and second filters, respectively, when flow has been diverted from passing through them.

* * * * *

UNITED STATES PATENT AND TRADEMARK OFFICE
CERTIFICATE OF CORRECTION

PATENT NO. : 4,615,800  Page 1 of 2

DATED : October 7, 1986

INVENTOR(S) : Jack Stifelman et al

It is certified that error appears in the above-identified patent and that said Letters Patent is hereby corrected as shown below:

Column 1, line 6, delete "particulary" and insert therefor --particularly--.

Column 2, line 33, delete "filter" and insert --fluid--.

Column 3, line 55, delete "therfore" and insert --therefore--.

Column 5, line 15, "shwon" should be --shown--.

Column 7, line 5, delete "shufoff" and insert --shutoff--.

Column 7, line 8, delete "now" and insert --nor--.

Column 7, line 15, delete "dilter" and insert --filter--.

Column 7, line 19, delete "includes" and insert --include--.

Column 7, line 28, delete "bypss" and insert --bypass--.

Column 7, line 55, delete "filiters" and insert --filters--.

Column 8, line 60, delete "opening" and insert therefor --openings--.

UNITED STATES PATENT AND TRADEMARK OFFICE
CERTIFICATE OF CORRECTION

PATENT NO. : 4,615,800

DATED : October 7, 1986

INVENTOR(S) : Jack Stifelman et al

It is certified that error appears in the above-identified patent and that said Letters Patent is hereby corrected as shown below:

Column 10, line 2, delete "differentinal" and insert therefor --differential--.

Column 11, line 5, delete "seid" and insert --said--.

Signed and Sealed this

Thirteenth Day of January, 1987

Attest:

DONALD J. QUIGG

*Attesting Officer*      *Commissioner of Patents and Trademarks*